United States Patent [19]

Brennan

[11] 4,439,550

[45] Mar. 27, 1984

[54] AROMATIC POLYOLS MADE FROM RECYCLED POLYETHYLENE TEREPHTHALATE WASTE STREAMS, ALKYLENE GLYCOL AND DIBASIC ACID WASTE STREAMS

[75] Inventor: Michael E. Brennan, Austin, Tex.

[73] Assignee: Texaco Inc., White Plains, N.Y.

[21] Appl. No.: 443,778

[22] Filed: Nov. 22, 1982

[51] Int. Cl.$^3$ .............................................. C08G 18/14
[52] U.S. Cl. .................................. 521/131; 521/48.5; 521/172; 521/173; 252/182; 528/308.1
[58] Field of Search .............. 521/172, 173, 131, 48.5; 528/308.1; 560/92; 252/182

[56] References Cited

U.S. PATENT DOCUMENTS

| | | | |
|---|---|---|---|
| 3,079,350 | 2/1963 | Bernstein | 260/2.5 |
| 3,344,091 | 9/1967 | Russin et al. | 260/2.3 |
| 3,590,070 | 6/1971 | Martin et al. | 560/93 |
| 3,647,759 | 3/1972 | Walker | 260/75 R |
| 3,755,212 | 8/1973 | Dunlap et al. | 260/2.5 BD |
| 3,892,796 | 7/1975 | Leibfried | 260/468 K |
| 4,048,104 | 9/1977 | Svoboda et al. | 260/2.5 AN |
| 4,186,257 | 1/1980 | Blahak et al. | 521/159 |
| 4,223,068 | 9/1980 | Carlstrom et al. | 428/310 |
| 4,233,408 | 11/1980 | Satterly et al. | 521/172 |
| 4,237,238 | 12/1980 | DeGuiseppi et al. | 521/131 |
| 4,246,365 | 1/1981 | Wiedermann et al. | 521/172 |

OTHER PUBLICATIONS

Chemical Abstracts, vol. 78, paragraph 160452n (1973), Abstract of East German patent 92,801, published 9/72.
Chemical Abstracts, vol. 84, paragraph 5638h (1976), Abstract of German Offen. 2,506,353, published 8/75.
Chemical Abstracts, vol. 86, paragraph 190834w (1977), Abstract of East German patent 122986, published 11/76.

*Primary Examiner*—Maurice J. Welsh
*Attorney, Agent, or Firm*—Jack H. Park; Kenneth R. Priem; David L. Mossman

[57] ABSTRACT

Mixtures of aromatic polyols containing ester functionalities suitable for use as polyol extenders in rigid foams prepared by reacting dibasic acid residues with an alkylene glycol residue, the reaction product of which is reacted with recycled polyethylene terephthalate are described. Surprisingly, the process is non-catalytic. These novel polyols may be blended with conventional polyols to yield excellent rigid foams, thus serving as useful polyol extenders.

18 Claims, No Drawings

AROMATIC POLYOLS MADE FROM RECYCLED POLYETHYLENE TEREPHTHALATE WASTE STREAMS, ALKYLENE GLYCOL AND DIBASIC ACID WASTE STREAMS

CROSS-REFERENCE TO RELATED APPLICATION

This application is related to U.S. patent application Ser. No. 443,719, filed on Nov. 22, 1982, which relates to polyol production from the reaction of polyethylene terephthalate residues with the reaction product of adipic acid waste streams and alkylene glycol residues.

BACKGROUND OF THE INVENTION

1. Field of the Invention

The invention relates to polyols for rigid polyurethane foams and more particularly relates to such aromatic polyester polyols which are made from the waste streams of dibasic acids, alkylene glycols and recycled or scrap polyethylene terephthalate.

2. Description of Other Relevant Compounds in the Field

It is known to prepare polyurethane foam by the reaction of polyisocynate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having hydroxyl and ester functionalities for use in preparing rigid foams, being produced by the process comprising esterifying, in the absence of a catalyst, a dibasic acid residue with an alkylene glycol to form a polyester polyol and subsequently transesterifying, in the absence of a catalyst, recycled polyethylene terephthalate with the polyester polyol reaction product.

DETAILED DESCRIPTION OF THE PREFERRED EMBODIMENTS

In general, it has been discovered that rigid foams may be made using the mixture of aromatic polyester polyols of this invention either alone or as polyol extenders together with other polyols. In addition, such a polyol mixture is compatible with the trichlorofluoromethane blowing agent. The novel aromatic polyester polyol mixtures are made by using recycled polyethylene terephthalate (PET). This may be any scrap residue from old polyethylene terephthalate which contains compounds which have the moiety

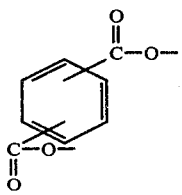

Generally, the scrap or recycled polyethylene terephthalate may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent is also useful.

The polyester polyol with which the polyethylene terephthalate scrap is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid which contain portions of each of the three acids listed above. It is necessary that the acids be dibasic so that polymer chains can be formed upon reaction with the glycol. These materials may also include waste dicarboxylic acids.

Preferably, the alkylene glycol has the formula

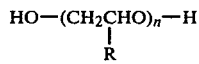

where R is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others. The glycol may be a residue or flash-separated glycol.

The polyester polyol which results from the reaction of the dibasic acid residue and an alkylene glycol may be a diester diol. Such a diol may be defined by the formula

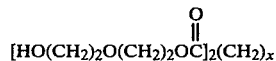

(I)

where x is 2 to 4.

The proportions of the reactants should be such as to give a resulting mixture of aromatic polyester polyols which have an average OH (hydroxyl) number within the desired range of about 100 to 400. The saponification number of the scrap polyethylene terephthalate (a measure of transesterification sites) should be considered in selecting proportions, if obtainable. One PET unit has a molecular weight of 192.2. Preferably the approximate mole ratio of scrap polyethylene terephthalate to dibasic acid to alkylene glycol may be about 1:1:2. These proportions could vary 5% in either direction. What actually forms the "polyol" of this invention is a mixture of polyols having ester functions, even though the mixture is sometimes referred to as a singular "polyol".

Generally, both reactions need heat between ambient and about 300° C. to proceed. Preferably, the temperature for both steps should be between 140° and 220° C. Unlike some prior art processes, both steps are non-catalytic. The pressure can be atmospheric, subatmospheric or autogenous. The polyol should have a hydroxyl number in the range of 100 to 400, with an especially preferred hydroxyl number range of 125 to 300.

These mixtures can serve as polyol extenders when they are blended with conventional polyols for use in polyurethane foams. The polyols of this invention can also be used alone to prepare isocyanurate foams.

There is good compatibility of the polyols of this invention with trichlorofluoromethane. Trichlorofluoromethane, sold under the tradename FREON® R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200-800. Usually the polyether polyol comprises 0-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine.

The final polyol combination more preferably comprises 0–95 percent by weight of said polyether polyol and 100–5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

The polyol extenders of this invention will be compared with some commercial polyol extenders. Hercules, Inc., Wilmington, Del., sells dimethyl terephthalate (DMT) residues under the tradename of TERATE® 101. Hercules also sells TERATE 200 series resins which are DMT resins modified with a glycol as seen in U.S. Pat. Nos. 4,237,238 and 3,647,759. The TERATE 200 series resins are useful as polyol extenders. Similar DMT residues having a different composition but still containing the aromatic, esters and acids are also sold by DuPont and others. Freeman Chemical Company produces a polyol extender known as CHEMPOL® 30-2150 which has a hydroxyl number of about 210. It is the reaction product of recycled PET, diethylene glycol and pure dimethyl glutarate, which is quite expensive. See U.S. Pat. Nos. 4,223,068 and 4,048,104 to Freeman Chemical Co.

It may be readily seen from the examples that the polyol mixtures of this invention work as well in the role of polyol extenders as do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol mixtures that give foams with optimal properties.

ESTERIFICATIONS OF WASTE DIBASIC ACID STREAMS

Example I

Diethylene Glycol (DEG)

A 2-liter three-neck round bottom flask, equipped with a thermometer (Therm-O-Watch), magnetic stirring bar, nitrogen inlet, distillation head with water cooled condenser and a tared receiver was charged with 521.8 g (4.04 moles) of DuPont solid dibasic acid (DBA; 56% glutaric acid, 23% succinic acid, 20% adipic acid, ~1% organic nitrogen compounds, ~0.2% nitric acid; 868.22 acid no., 0.41% N, 0.82% water, 221 ppm copper and 162 ppm vanadium) and 857.2 g (8.08 moles) DEG. The whole was then stirred and heated under nitrogen. The reaction solution became homogeneous at 100° C. Distillate (132.0 g; 98.1% water) was collected overhead at 85°-99° C./144°-215° C. (pot)/1 atmosphere over 3⅔ hours. The bottoms product (1244.0 g), a dark mobile liquid, was recovered after cooling under nitrogen to room temperature. Total recovery was 99.78%. Proton nuclear magnetic resonance spectra confirmed the product structure to be a diester diol of formula (I). The product analyzed as follows:

| Hydroxyl number | 368 |
|---|---|
| Acid number | 26.12 |
| Saponification number | 342.06 |
| Water, % | 0.83 |
| Nitrogen, % | 0.07 |
| Viscosity, cs, 25° C. | 165 |
| Copper, ppm | 47.2 |
| Vanadium, ppm | 27.3 |

Prior art references report hydroxyl numbers of 327 (viscosity, 210 cp at 25° C.) and 365±5 for a product prepared by tetraoctyl titanate catalyzed transesterification of dimethyl glutarate with DEG (150°-225° C., 16 hours), see U.S. Pat. No. 4,048,104.

Example II

Glycol Residue (DEG, TEG, etc.)

As in the previous reaction, 537.5 g (4.16 moles) of DBA was reacted with 1085.8 g (8.32 moles) of glycol residue (Texaco Chemical; 860 hydroxyl number, 1.65% water; molecular weight average of 130.5). In this case, a homogeneous reaction solution was obtained at 90° C. Distillate (160.0 g; 98.1% water) was collected overhead at 66°-115° C./151°-215° C. (pot)/1 atmosphere over 4 1/6 hours. Product (1458.5 g) was again a dark, mobile liquid. Total recovery was 99.7%. Product structure was shown to be a diester diol by nuclear magnetic resonance analysis. The product analyzed as follows:

| Hydroxyl number | 330 |
|---|---|
| Acid number | 13.02 |
| Saponification number | 304.24 |
| Water, % | 0.65 |
| Viscosity, cs, 25° C. | 323 |
| Copper, ppm | 20.2 |
| Vanadium, ppm | 28.1 |

CLEAVAGE/ESTERIFICATIONS OF RECYCLED PET

Example III

PET/DBA-DEG Diester Diol (Mole ratio=1/1)

A 1-liter three-neck round bottom flask, equipped with a mechanical stirrer, thermometer (Therm-O-Watch), water cooled distillation head, nitrogen inlet and a tared receiver was charged with 232.0 g (1.2 equiv.) PET chips (green and clear from recycled soft drink bottles) and 368.0 g (1.2 moles) of DBA-DEG diester diol from Example I. The whole was then stirred and heated under a nitrogen atmosphere at 1 atmosphere pressure to 210° C. over 1.0 hour and then held at 210°-220° C. for 6.0 hours. A small amount of distillate (3.9 g; expected 3.0 g water from Example I) was collected during the total reaction time at 71°-44° C./200°-220° C. (pot). The product (592.0 g), a dark, mobile liquid, was recovered after cooling to near room temperature under nitrogen. Total recovery was 99.3%.

Analyses of product and the prior art product (dimethyl glutarate derived) follow:

|  | Example III | CHEMPOL 30-2150 |
|---|---|---|
| Hydroxyl number | 231 | 210 |
| Acid number | 4.45 | 1.76 |
| Saponification number | 438.09 | 431.33 |
| Water, % | 0.23 | 0.05 |
| Viscosity, cs, 25° C. | 3,564 | 3,529 |
| Copper, ppm | 18.1 | — |
| Vanadium, ppm | 25.3 | — |
| Titanium, ppm | — | 439 |

Example IV

PET/DBA-GR Diester Diol (Mole ratio=1/1)

As in the previous experiment, 232.0 g (1.2 equiv.) PET chips (green and clear) were reacted with 410.5 g (1.2 moles) DBA-GR diester diol from Example II. Reaction conditions were identical to the previous run. Results follow: Distillate: 6.0 g; 89.4% water (expected 2.7 g water from Example II). Product: 634.0 g dark, mobile liquid. Total recovery: 99.6%. The product analyzed as follows:

| Hydroxyl number | 185 |
|---|---|
| Acid number | 6.10 |
| Saponification number | 398.65 |
| Water, % | 0.18 |
| Viscosity, cs, 25° C. | 6,213 |
| Copper, ppm | 19.5 |
| Vanadium, ppm | 21.6 |

ONE-POT PROCESS EXAMPLES

EXAMPLE V

PET/DBA/DEG (Mole ratio=1/1/2)

As in the previous experiments, a 2-liter flask was charged with 513.2 g (2.67 equiv.) PET chips (green and clear), 344.4 g (2.67 moles) of DBA and 565.8 g (5.33 moles) of DEG. The whole was then stirred and heated under a nitrogen atmosphere. Distillate (97.0 g; theor., 96.0 g; 99.7% water) was collected overhead at 96°–50° C./136°–220° C. (pot)/1 atmosphere over 7.7 hours, of which 5.5 hours were at 210°–220° C. Product (1320.0 g), a dark and mobile liquid, was recovered as before. Total recovery was 99.6%. The product analyzed as follows:

| Hydroxyl number | 231 |
|---|---|
| Acid number | 4.98 |
| Saponification number | 443.12 |
| Water, % | 0.15 |
| Viscosity, cs, 25° C. | 3,115 |

| Copper, ppm | 22.5 |
|---|---|
| Vanadium, ppm | 21.5 |

EXAMPLE VI

PET/AGS/Flashed Glycol (Mole ratio=1/1/2)

Monsanto AGS flakes is a waste dicarboxylic acid stream similar to DuPont DBA. AGS typically contains 13–18% adipic acid, 55–59% glutaric acid, 22–24% succinic acid, 0.2–1.4% other dibasic acids, 0.1–1.0% monobasic acids, 0.1–0.3% picric acid, 2–3% other organics, 0.01–0.2% nitric acid; analyzed for 874.07 acid number, 0.74% water, 0.51% nitrogen, 2.72 ppm copper and 567 ppm vanadium.

Texaco Chemical flashed glycol analyzed for 1.33% water and a hydroxyl number of 1070.5 and contained 14.2% EG, 59.5% DEG and 26.3% TEG, basis $^{13}C$ nuclear magnetic resonance analysis.

As in the previous experiments, a 1-liter flask was charged with 288.3 g (1.5 equiv.) PET (Eastman scrap, class IIB, white), 192.5 g (1.5 moles) AGS flakes and 314.4 g (3.0 moles) flashed glycol. The whole was then stirred and heated under a nitrogen atmosphere. Distillate (61.2 g.; 93.1% water) was collected overhead at 104°–53° C./160°–220° C. (pot)/1 atmosphere over 7.5 hours, of which 6.0 hours were at 210°–220° C. Product (730.0 g) was a somewhat "murky" brown, mobile liquid. Total recovery was 99.5%. The product analyzed as follows:

| Hydroxyl number | 234 |
|---|---|
| Acid number | 3.66 |
| Saponification number | 441.14 |
| Water, % | 0.09 |
| Viscosity, cs, 25° C. | 6,271 |
| Copper, ppm | 1.10 |
| Vanadium, ppm | 175 |
| Iron, ppm | 17.9 |

Preparation of Fire Retarded Rigid Polyurethane Foams

Rigid foams were prepared from 70:30 wt.% polyol blends of THANOL ® R-350-X or R-650-X with the extenders TERATE 203, CHEMPOL 30-2150 and the polyols of this invention. The formulation components were mixed at 2700 rpm and poured into 8"×8"×12" (600 g pour) or 8"×5"×6" (200 g pour) open molds and allowed to rise. The resulting foams were allowed to stand at room temperature for at least three days before testing. Formulations and foam physical properties are listed below.

Example VII

THANOL R-350-X Formulations

|  | A | B | C | D | E | F |
|---|---|---|---|---|---|---|
| Formulation, pbw |  |  |  |  |  |  |
| THANOL R-350-X (OH = 534) | 33.8 | 25.5 | 26.4 | 25.6 | 26.0 | 25.6 |
| TERATE 203 (OH = 318) | — | 10.9 | — | — | — | — |
| CHEMPOL 30-2150 (OH = 210) | — | — | 11.3 | — | — | — |
| Polyol, Ex. III (OH = 231) | — | — | — | 11.0 | — | — |
| Polyol, Ex. IV (OH = 185) | — | — | — | — | 11.2 | — |
| Polyol, Ex. V (OH = 231) | — | — | — | — | — | 11.0 |
| FYROL PCF[1] | 5.0 | 5.0 | 5.0 | 5.0 | 5.0 | 5.0 |
| Water | 0.3 | 0.3 | 0.3 | 0.3 | 0.3 | 0.3 |
| FREON R-11B[2] | 13.0 | 13.0 | 13.0 | 13.0 | 13.0 | 13.0 |

-continued

|  | A | B | C | D | E | F |
|---|---|---|---|---|---|---|
| L-5420[3] | 0.5 | 0.5 | 0.5 | 0.5 | 0.5 | 0.5 |
| FOMREZ UL-32[4] | 0.01 | 0.01 | 0.01 | 0.01 | 0.01 | 0.01 |
| MONDUR MR[5] (index = 1.1, 1.1, 1.15) | 47.4 | 44.8 | 43.5 | — | — | — |
| PAPI 27[6] (index = 1.15) | — | — | — | 44.6 | 44.0 | 44.6 |
| Times, seconds, mixing | 10 | 10 | 9 | 12 | 12 | 15 |
| Times, seconds, cream | 26 | 15 | 17 | 23 | 19 | 18 |
| Times, seconds, gel | 66 | 57 | 67 | 65 | 60 | 66 |
| Times, seconds, tack free | 98 | 83 | 113 | 102 | 102 | 115 |
| Times, seconds, rise | 105 | 115 | 150 | 115 | 120 | 153 |
| Initial surface friability | None | None | None | None | None | None |
| Foam appearance | Very Good | Good | Good | Good | Good | Good |
| Physical Properties | | | | | | |
| Density, lbs/ft$^3$ | 1.87 | 1.68 | 1.72 | 1.72 | 1.67 | 1.72 |
| K-factor | 0.118 | 0.110 | 0.124 | 0.122 | 0.127 | 0.128 |
| Compressive str., psi | | | | | | |
| with rise | 41.44 | 37.13 | 40.20 | 36.95 | 34.99 | 39.50 |
| against rise | 19.26 | 12.69 | 11.17 | 10.86 | 12.29 | 14.32 |
| Heat distortion, °C. | 152 | 129 | 118 | 112 | 114 | 116 |
| % Closed cells | 91.79 | 93.64 | 91.19 | 95.01 | 92.60 | 91.50 |
| Friability, wt. % loss, 10 min | 8.18 | 2.35 | 2.60 | 1.80 | 0.42 | — |
| ASTM 1692 Burn, in/min (BHA) | 2.49 | 2.08 | 1.63 | 2.00 | 2.09 | 1.63 |
| Butler Chimney Test | | | | | | |
| Flame height, in | >11 | >11 | >11 | >11 | >11 | >11 |
| Seconds to extinguish | 19 | 14 | 14 | 12 | 21 | 15 |
| Wt. % retained | 58.7 | 78.2 | 69.4 | 69.8 | 54.3 | 68.1 |

[1]Fire retardant sold by Stauffer Chemical Co.
[2]Trichlorofluoromethane
[3]A silicon surfactant sold by Union Carbide Corp.
[4]A tin catalyst sold by Witco Chemical Corp.
[5]A polymeric isocyanate sold by Mobay Chemical Corp.
[6]A polymeric isocyanate sold by Upjohn Co.

EXAMPLE VIII

THANOL R-650-X Formulations

|  | G | H | I | J | K | L |
|---|---|---|---|---|---|---|
| Formulation, pbw | | | | | | |
| THANOL R-650-X (OH = 455) | 37.0 | 27.2 | 28.3 | 27.5 | 28.0 | 27.5 |
| TERATE 203 (OH = 318) | — | 11.7 | — | — | — | — |
| CHEMPOL 30-2150 (OH = 210) | — | — | 12.1 | — | — | — |
| Polyol, Ex. III (OH = 231) | — | — | — | 11.8 | — | — |
| Polyol, Ex. IV (OH = 185) | — | — | — | — | 12.0 | — |
| Polyol, Ex. V (OH = 231) | — | — | — | — | — | 11.8 |
| FYROL PCF | 5.0 | 5.0 | 5.0 | 5.0 | 5.0 | 5.0 |
| Water | 0.3 | 0.3 | 0.3 | 0.3 | 0.3 | 0.3 |
| FREON R-11B | 13.0 | 13.0 | 13.0 | 13.0 | 13.0 | 13.0 |
| L-5420 | 0.5 | 0.5 | 0.5 | 0.5 | 0.5 | 0.5 |
| FOMREZ UL-32 | 0.01 | 0.01 | 0.01 | 0.01 | 0.01 | 0.01 |
| MONDUR MR (index = 1.1, 1.1, 1.15) | 44.2 | 42.3 | 40.8 | — | — | — |
| PAPI 27 (index = 1.15) | — | — | — | 41.9 | 41.2 | 41.9 |
| Times (secs), mixing | 8 | 10 | 9 | 9 | 9 | 10 |
| Times (secs), cream | 12 | 12 | 17 | 17 | 16 | 14 |
| Times (secs), gel | 51 | 50 | 65 | 58 | 55 | 54 |
| Times (secs), tack free | 64 | 60 | 99 | 85 | 78 | 78 |
| Times (secs), rise | 109 | 84 | 156 | 105 | 95 | 121 |
| Initial surface friability | None | None | None | None | None | None |
| Foam appearance | Very Good | Good | Good | Good | Good | Good |
| Physical Properties | | | | | | |
| Density, lbs/ft$^3$ | 1.74 | 1.78 | 1.88 | 1.80 | 1.84 | 1.85 |
| K-factor | 0.118 | 0.113 | 0.120 | 0.118 | 0.119 | 0.112 |
| Compressive str. (psi), | | | | | | |
| with rise | 35.94 | 35.8 | 40.93 | 38.13 | 40.97 | 44.21 |
| against rise | 14.32 | 12.58 | 11.64 | 11.00 | 12.50 | 12.44 |
| Heat distortion, °C. | 137 | 138 | 110 | 108 | 102 | 100 |
| % Closed cells | 92.02 | 94.86 | 92.55 | 90.87 | 89.95 | 91.30 |
| Friability, wt. % loss, 10 min | 6.19 | 2.37 | 1.30 | 1.92 | 1.52 | — |
| ASTM 1692 Burn, in/min | 2.97 | 2.36 | 2.08 | 2.31 | 2.10 | 2.00 |

|  | G | H | I | J | K | L |
|---|---|---|---|---|---|---|
| (BHA) | | | | | | |
| Butler Chimney Test | | | | | | |
| Flame height, in | >11 | 9 | >11 | >11 | >11 | >11 |
| Seconds to extinguish | 14 | 12.3 | 11 | 13 | 10 | 11 |
| Wt. % retained | 63.9 | 79.0 | 73.5 | 70.1 | 76.2 | 69.5 |

EXAMPLE IX

Preparation of Polyisocyanurate Foams

The foams were prepared as in Examples VII and VIII. Formulations and foam physical properties are listed below.

|  | M | N | O | P |
|---|---|---|---|---|
| Formulation, pbw | | | | |
| CHEMPOL 30-2150 (OH = 210) | 23.7 | — | — | — |
| Polyol, Ex. III (OH = 231) | — | 22.1 | — | — |
| Polyol, Ex. IV (OH = 185) | — | — | 25.9 | — |
| Polyol, Ex. V (OH = 231) | — | — | — | 22.1 |
| Silicone DC-193 | 0.5 | 0.5 | 0.5 | 0.5 |
| FREON R-11B | 12.0 | 12.0 | 12.0 | 12.0 |
| DABCO TMR-2[1] | 1.5 | 1.5 | 1.5 | 1.5 |
| MONDUR MR (index = 5.2) | 62.3 | — | — | — |
| PAPI 27 (index = 5.2) | — | 63.9 | 60.1 | 63.9 |
| Times, seconds, mixing | 3 | 7 | 7 | 7 |
| Times, seconds, cream | 15 | 15 | 11 | 13 |
| Times, seconds, gel | 18 | 35 | 29 | 25 |
| Times, seconds, tack free | 21 | 38 | 37 | 30 |
| Times, seconds, rise | 56 | 65 | 57 | 55 |
| Initial surface friability | None | None | None | None |
| Foam appearance | Good | Fair | Good | Fair |
| Physical Properties | | | | |
| Density, lbs/ft$^3$ | 2.36 | 1.98 | 1.87 | 1.96 |
| K-factor | — | 0.137 | 0.125 | 0.134 |
| Compressive strength, psi, | | | | |
| with rise | 48.34 | 27.23 | 37.65 | 35.22 |
| against rise | 22.03 | 13.62 | 10.86 | 13.87 |
| Heat distortion, °C. | 224 | >225 | 213 | 220 |
| % Closed cells | 91.91 | 89.90 | 92.40 | 94.50 |
| Friability, wt. % loss, 10 min | 10.4 | 15.44 | 18.84 | 15.17 |
| ASTM 1692 Burn, in/min (BHA) | — | 1.33 | 1.46 | 1.23 |
| Butler Chimney Test | | | | |
| Flame height, in | — | 5.3 | 5.8 | 5.2 |
| Seconds to extinguish | — | 13.0 | 12.0 | 12.7 |
| Wt. % retained | — | 91.3 | 88.5 | 91.4 |

[1]A tertiary amine catalyst product of Air Products and Chemicals, Inc.

I claim:

1. A mixture of aromatic polyols having hydroxyl and ester functionalities for use in preparing rigid foams, being produced by the process comprising
   a. esterifying, in the absence of a catalyst, a residue from dibasic acid manufacture which comprises one or more acids from the group consisting of glutaric acid, succinic acid and adipic acid, with an alkylene glycol to produce a polyester polyol and
   b. transesterifying, in the absence of a catalyst, recycled polyethylene terephthalate with the polyester polyol reaction product from the previous step.

2. The mixture of aromatic polyols of claim 1 in which the alkylene glycol has the formula

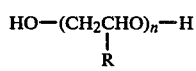

where R is hydrogen or lower alkyl of 1 to 4 carbon atoms and n is from 1 to 3.

3. The mixture of polyols of claim 1 in which the alkylene glycol is a glycol waste stream.

4. The mixture of polyols of claim 1 in which the approximate mole ratio of the reactants polyethylene terephthalate scrap:dibasic acid waste:alkylene glycol is 1:1:2.

5. The mixture of polyols of claim 1 in which the reactions are conducted at a temperature between 140° to 220° C.

6. The mixture of polyols of claim 1 in which the average hydroxyl number of the resultant mixture is between 100 and 400.

7. A mixture of aromatic polyols having hydroxyl and ester functionalities for use in preparing rigid foams, being produced by the process comprising
   a. esterifying, in the absence of a catalyst, a residue from dibasic acid manufacture which comprises one or more acids selected from the group consisting of glutaric acid, succinic acid and adipic acid, with an alkylene glycol waste stream containing alkylene glycols of the formula

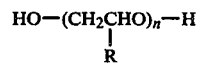

where R is hydrogen or lower alkyl of 1 to 4 carbon atoms and n is from 1 to 3, to produce a polyester polyol, and b. transesterifying, in the absence of a catalyst, recycled polyethylene terephthalate with the polyester polyol reaction product from the previous step, such that the reactions are conducted at a temperature between 140° to 220° C. and in which the average hydroxyl number of the resultant polyol mixture is between 100 and 400.

8. A method for making a mixture of aromatic polyols having hydroxyl and ester functionalities for use in preparing rigid foams, comprising a. esterifying, in the absence of a catalyst, a residue from dibasic acid manufacture which comprises one or more acids from the group consisting of glutaric acid, succinic acid and adipic acid, with an alkylene glycol to produce a polyester polyol, and b. transesterifying, in the absence of a catalyst, recycled polyethylene terephthalate with the polyester polyol reaction product from the previous step.

9. The method of claim 8 in which the alkylene glycol is a glycol waste stream comprising alkylene glycols of the formula

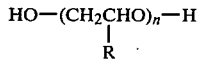

where R is hydrogen or lower alkyl of 1 to 4 carbon atoms and n is from 1 to 3, and 10. The method of claim 8 in which the approximate mole ratio of the reactants recycled polyethylene terephthalate:dibasic acid waste:alkylene glycol is 1:1:2.

11. The method of claim 8 in which the reactions are conducted at a temperature between 140° and 220° C. and at a pressure between one atmosphere and subatmospheric.

12. The method of claim 8 in which the average hydroxyl number of the resultant mixture is between 100 and 400.

13. A rigid polyurethane foam obtained by reacting in the presence of a blowing agent and a catalyst of polyurethane formation an organic polyisocyanate and a polyol blend comprising a. from about 5 to 100 percent by weight of a mixture of aromatic polyols having ester functionalities which is the reaction product from
  (1) esterifying, in the absence of a catalyst, a residue from dibasic acid manufacture which comprises one or more acids from the group consisting of glutaric acid, succinic acid and adipic acid, with an alkylene glycol to produce a polyester polyol and
  (2) transesterifying, in the absence of a catalyst, recycled polyethylene terephthalate with the polyester polyol reaction product from the previous step, and b. from about 95 to 0 percent by weight of a nitrogen-containing polyol which is the reaction product from
  (1) reacting one mole of phenol or nonylphenol with one to 2 moles of diethanolamine to give a Mannich reaction product and
  (2) subsequently reacting one mole of the Mannich reaction product with 2 to 3 moles of propylene oxide.

14. The rigid polyurethane foam of claim 13 in which the polyol blend has an average hydroxyl number in the range from 100 to 500.

15. The rigid polyurethane foam of claim 13 in which the blowing agent is trichlorofluoromethane.

16. A rigid polyisocyanurate foam which is obtained by reacting in the presence of a blowing agent and a trimerization catalyst of polyisocyanate formation, an organic polyisocyanate and a mixture of aromatic polyols having ester functionalities which is the reaction product of the process comprising a. esterifying, in the absence of a catalyst, a residue from dibasic acid manufacture which comprises one or more acids from the group consisting of glutaric acid, succinic acid and adipic acid, with an alkylene glycol to produce a polyester polyol and b. transesterifying, in the absence of a catalyst, recycled polyethylene terephthalate with the polyester polyol reaction product from the previous step.

17. The rigid polyisocyanurate foam of claim 16 in which the mixture of aromatic polyols have an average hydroxyl number in the range of 100 to 400.

18. The rigid polyisocyanurate foam of claim 16 in which the blowing agent is trichlorofluoromethane.

* * * * *